Nov. 23, 1937.　　　E. J. LAUTERBUR　　　2,099,937
APPARATUS FOR DOUGH PREPARATION
Filed April 9, 1934　　　4 Sheets-Sheet 1

INVENTOR.
EDWARD J. LAUTERBUR

ATTORNEYS.

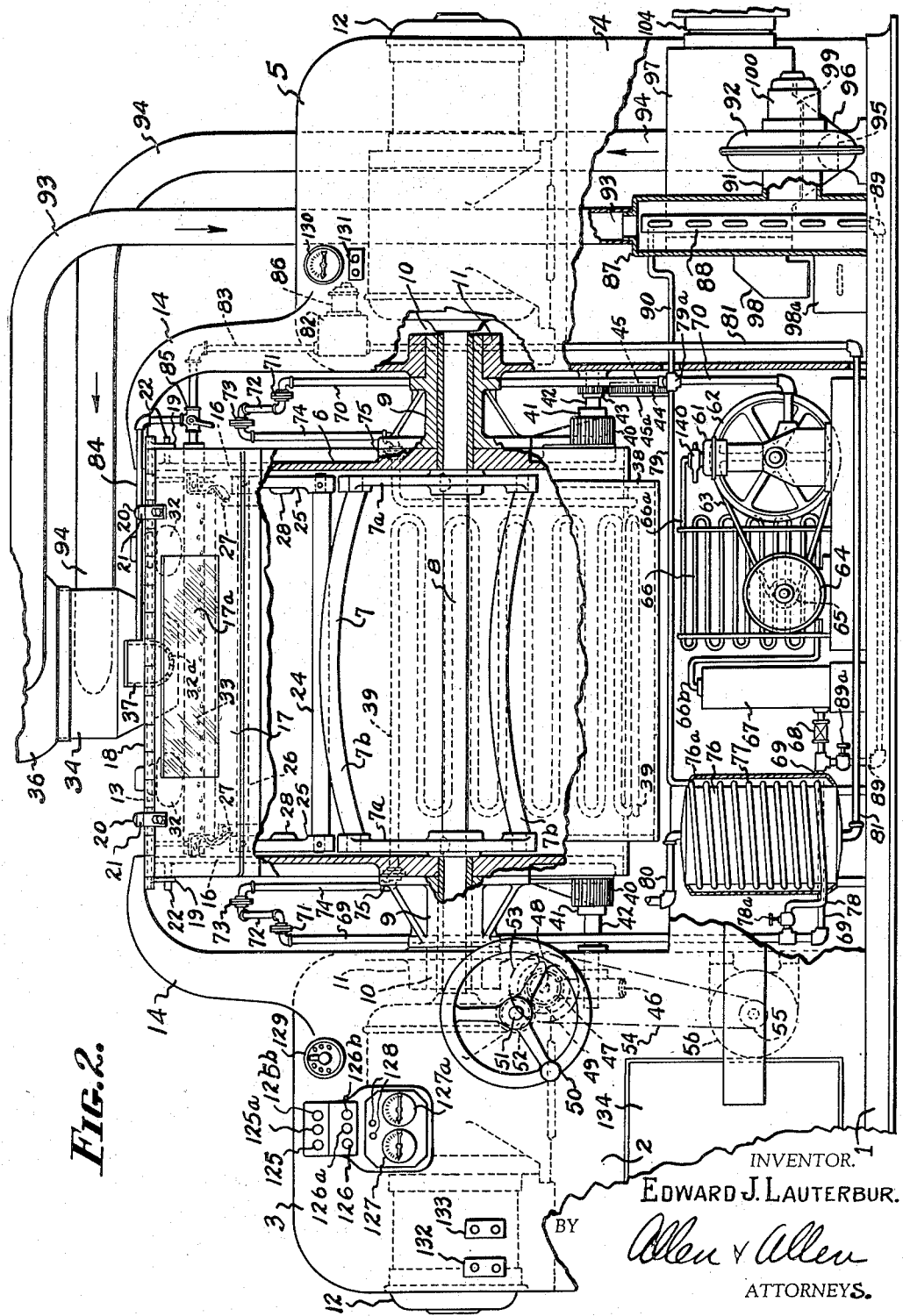

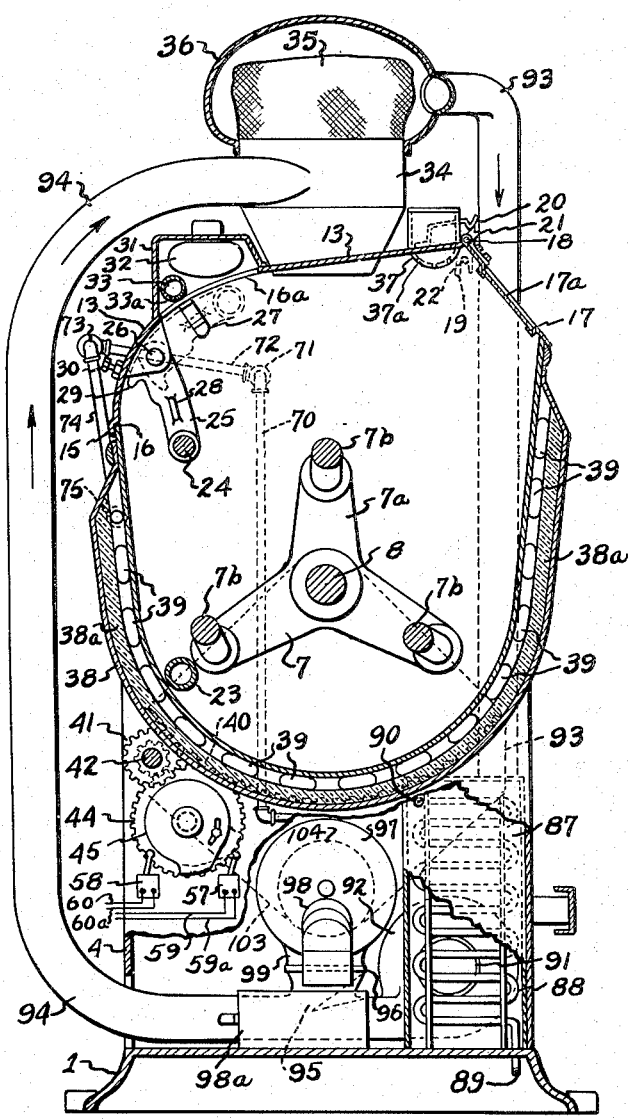

Patented Nov. 23, 1937

2,099,937

UNITED STATES PATENT OFFICE 2,099,937

APPARATUS FOR DOUGH PREPARATION

Edward J. Lauterbur, Sidney, Ohio, assignor to Peerless Bread Machinery Corporation, Sidney, Ohio, a corporation of Ohio Application April 9, 1934, Serial No. 719,685

5 Claims. (Cl. 107—4)

My invention relates to bakery apparatus, and more especially to dough mixing apparatus.

An object of my invention is to supply flour or the like to the mixing means in predetermined quantity and at a predetermined and controlled temperature.

A further object is to conserve energy in the process of controlling the temperature of the flour or the like, by repeated use of air in the operation of supplying the flour to the mixing means.

A further object is to afford a more definite and automatic control of supply of leavening agent to the contents of the mixing apparatus, and a more rapid and thorough distribution of this supply.

A further object is to provide for subjecting the contents of the mixing apparatus to the action of light rays of a desired character, during the mixing operation.

A further object is to provide efficient means for cooling or controlling the temperature of the mixing apparatus and the contents thereof during the mixing operation; and preferably, to provide for such cooling in a bowl which is tiltable for dumping the contents, with suitable connections from a stationed refrigerating apparatus to the tiltable bowl.

A further object is to provide a tiltable mixing bowl with automatic control of the degree of tilting and return from tilted position; and to provide for either power or manual tilting, either one as desired, without hindrance by the means provided for the other kind of tilting.

A further object is to provide for powerful driving of agitating means to effect the mixing, with the power so applied as to impose a minimum of strain on the power transmission from the motive means to the agitator member.

A further object is to provide for very convenient control of the speed of the agitating mechanism; and preferably for automatic control of the duration of operation thereof. A further object is to provide, in conjunction with the duration control, for a manual control of the agitator operation.

A further object is to provide, in conjunction with a bowl that is tiltable and an agitator controlled as above described, means for insuring against simultaneous tilting of the bowl and agitator operation; yet allowing for operation of the agitator under manual control while the bowl is tilted.

A further object is to supply the water ingredient to the contents of the bowl at a controlled temperature and in controlled quantity, by very readily observed and manually operated means.

A further object of my invention is to provide for any two or more of the above objects, by an assembly and arrangement of devices for performing the several functions, in a compact unit, with the several devices located most advantageously for proper action, of themselves and in coaction with the other device or devices, and for ready access for the manual control and supervision of their operation.

Other objects, additional to or incident to the above mentioned objects, will occur in the course of the following description, illustrated by the accompanying drawings, in which—

Figure 2 is an enlarged partial side elevation corresponding to that of Figure 1, with the bowl partly in section to reveal the agitating and braking means in elevation, and with the base and the lower part of the right hand column broken away to reveal the blower and its air cooling device in section, and the refrigeration apparatus in elevation.

Figure 3 is a vertical cross section on the line 3—3 of Fig. 1.

Figure 4 is a partial similar section showing a modification of the bowl bottom.

Figure 1:
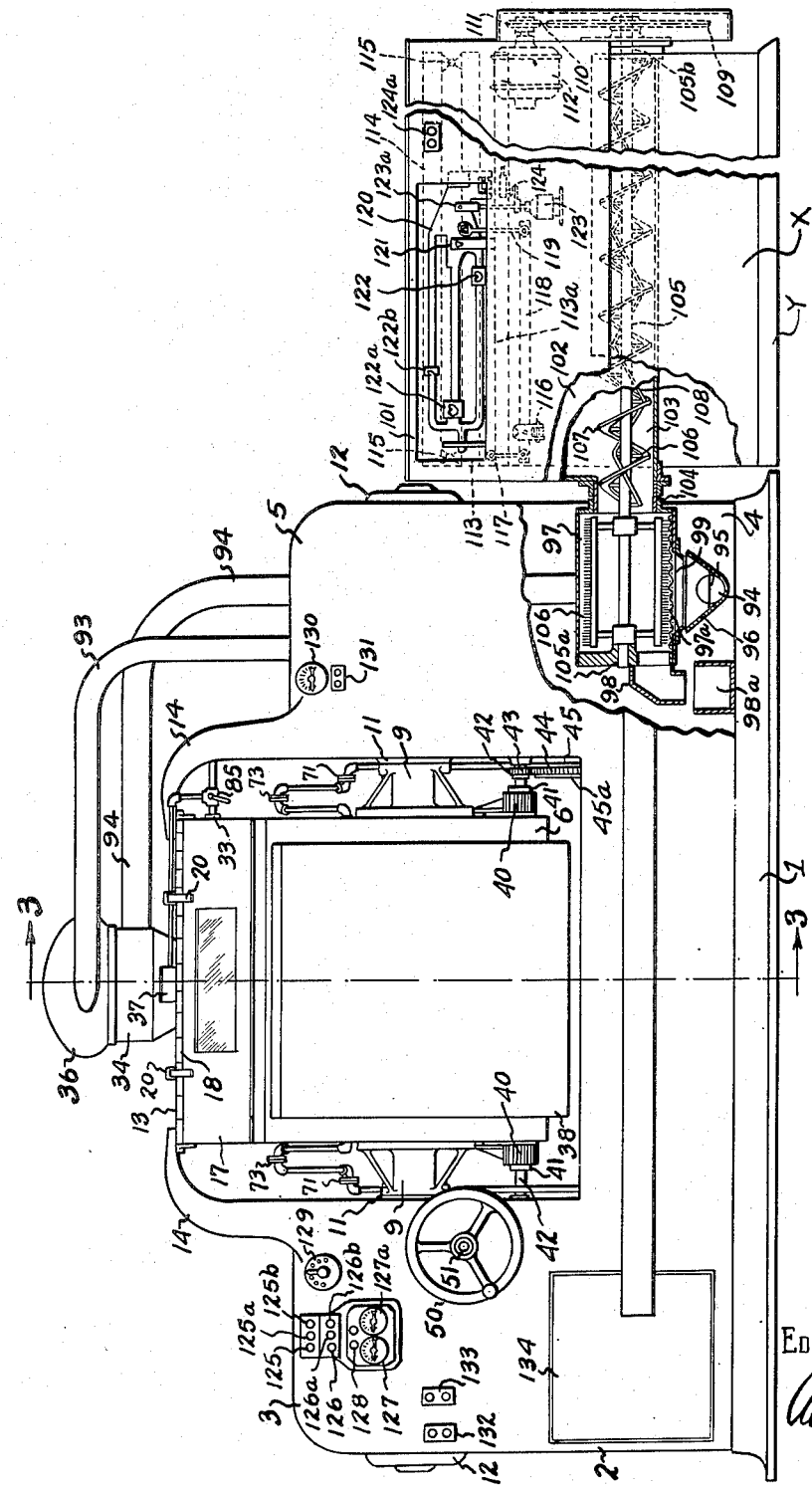
Figure 1 is a side elevation of an entire unit embodying my invention, parts being broken away to reveal the sifting device in section.

As I prefer to construct my improved dough preparing unit, a base 1 supports the left hand column 2 with a top head or hood 3, and the right hand column 4 with a top head or hood 5. In the space between these columns and spaced up from the base 1 is the mixing bowl 6 containing the agitator 7 which is fixed on the shaft 8 having bearings 9 in the side walls of the bowl. Each bearing has an extension 10, and these extensions have trunnion bearings 11 in the adjacent walls of the columns 2 and 4, respectively, pivoting the bowl 6 for tilting forwardly. The agitator shaft 8 extends through its bearings 9 and is continuous with the shafts of the speed reducing gearing units 8a connecting with the motors 12, which are located in the hoods 3 and 5, respectively. The agitator 7 is thus connected to both motors 12, so that each motor 12 supplies its portion of the power close to the agitator for rotating it; avoiding undue torsional strain on the shaft, such as would be imposed if one motor of the required power were stationed at one side only of the apparatus.

The agitator 7 is made up of spiders 7a fixed to the shaft 8 adjacent the respective side walls of the bowl 6, and bars 7b each with opposite ends fixed in arms of the spiders; these bars 7b being bent into bowed shape transversely of the bowl as well as being pitched at inclinations to the axis of agitator rotation. This construction affords an especially effective agitating and distributing action on the contents; but it does not require extended consideration herein, being fully disclosed and claimed in Patent No. 1,726,033, issued August 27th, 1929.

I prefer also to provide the apparatus with a stationary cover 13 for the bowl, supported on arms 14 upstanding from the tops of the column hoods 3 and 5, respectively. This is a construction fully set forth and claimed in my Patent No. 2,025,541 issued December 24, 1935. The cover 5 curves down at the rear so that its rear rim 15 is abutted on its forward side by the rim 16 of the rear wall of the bowl 6, allowing the bowl to swing forward therefrom, yet to tightly engage this rim 16 with the cover rim 15, as well as its side rim 16a with the side portions of the cover 13, when the bowl is tilted upward into position for the mixing operation. The front part of the cover 13 is straight, the side rims 16a of the bowl conforming thereto; and a lid 17, preferably in the form of a frame with a glass or other transparent panel 17a, is connected to the front edge of the cover 13 by a hinge 18. The front parts of the side rims of the bowl are slanted downwardly and forwardly to the top rim of the front wall of the bowl; and this lid 17 rests snugly on these rims when closed. The lid has forks 19 that straddle the bowl when this lid is closed; and at opposite sides, adjacent to the hinge 18, are latches 20 on the cover 13 and lugs 21 on the lid 17, which mutually retentively engage automatically when the lid 17 is raised to a certain height. The adjacent side walls of the bowl 6 have pins 22 which engage the respective forks 19, raising the lid until it is held by the latches 20, when the bowl 6 is tilted forwardly; and at this position, the lid has swung the longer rear members of its forks 19 into the paths of these pins 22, so that they release the lid from its latches, to return into closed position again under control of the fork and pin engagement, when the bowl is returned from its tilted position.

In a rear lower type of the interior of the bowl 6 is a brake 23, preferably of the roller type, diverting the bowl contents from the bowl wall with a minimum of friction, as set forth in the patent above mentioned; and also, after the principle of that patent, there is an upper rear brake 24, which however, is mounted to swing, as set forth and claimed in my patent above mentioned. This brake is in the form of a transverse bar, the ends of which are held in the lower ends of arms 25 near respective sides of the bowl interior; the upper ends of these arms 25 being pivotally connected at 26 with lugs on the under side of the bowl cover 13, which also supports latches 27 with which ribs 28 on the sides of the respective arms 24 retentively engage when the arms, with the brake 24, are swung upward by engagement of the rear rim 16 of the bowl with the arms, as the bowl is tilted forwardly. These latches 27 engage automatically and hold the arms and brake up for return of the rear rim 16 therepast; whereupon the rear rim 16 engages lugs 29 on the arms 25, pulling the arms down from the latches 27, to drop with the brake 24, to operative position again. This position is determined by adjustable stop screws 30 threaded through the cover 13 and engaged by the rear sides of the lugs 29.

Just forwardly from the brake support just described, the cover 13 has an upwardly projected portion or hump 31, forming an enclosure, within which, preferably near opposite ends thereof, are mounted lamps 32, which will be understood to be of any special character, such as ultra-violet-ray lamps, for affording a desired action on the mixer contents; as for instance, to augment their vitamin content. In the rear lower part of this hump 31 is the water distributing means, preferably in the form of a tube 33 of rather large diameter, extending transversely of the bowl and having perforations 33a at desired locations in its bottom wall.

Just forwardly from this hump 31 the cyclone separator casing 34 has its downwardly tapering lower part extended through and fixed to the bowl cover 13; this casing being open at its bottom for discharge into the bowl 6. Above this tapered part the casing 34 is cylindrical; and it is open at its top, with the pervious bag 35 secured over the open top. A dome 36 encloses this bag 35, being spaced therefrom throughout the sides and top of the bag, and being connected to the top rim of the cyclone separator casing in an air tight manner.

In front of the cyclone separator casing is the yeast pot 37, set into and fixed in the cover 13, with its bottom below the cover and having perforations 37a for discharge into the bowl 6.

The front and rear bowl walls, substantially throughout their areas, and the curved bottom of the bowl, are covered by a jacket 38 having the inside of its outer wall lined with suitable insulation 38a, such as cork, for resisting the passage of heat into the jacket. Hugging closely to the bowl walls and bottom, inside this jacket 38, are the refrigerating or cooling coils 39, being, as here shown, in the form of pipes extending transversely of the bowl and connected at their ends by return bends, forming a sinuated system of conductors for expanding heat absorbing medium, as is well known in the art of refrigeration.

Along each edge of the curved bottom of the bowl 6, exteriorly thereof, segmental racks 40, concentric with the tilting of the bowl on its trunnions 10, are fixed to the bowl. Meshing with the respective racks 40 are pinions 41 fixed on a shaft 42 extending transversely of the bowl at the rear lower part thereof and journaled in the inner walls of the respective columns 2 and 4. Near its bearing in the right hand column 4, this shaft 42 has fixed on it a pinion 43 meshing with a gear sector 44 which has fixed concentrically to it two cams 45 and 45a, all rotatable on a stud in the adjacent wall of the column 4. The shaft 42 extends past its bearing into the left hand column 2, where it has fixed on it the worm gear 46, meshing with a worm 47 fixed on a shaft 48 with a spur gear 49; this shaft 48 being journaled in the column walls. A handwheel 50 is fixed on the part of a shaft 51 extending out through the front wall of the column 2, in which the shaft is journaled; and on the part of this shaft 51 inside the column is fixed a pinion 52 meshing with the gear 49. The worm shaft 48 also has fixed on it a sprocket wheel 53, connected by a chain 54 with a sprocket pinion 55 fixed on the shaft of a motor 56 mounted in the lower part of the column 2.

The shape of cams 45, 45a is shown in Fig. 3, where are shown also the switches 57 and 58 operated thereby to automatically limit the forward or dumping tilting and the rearward or return tilting, respectively, of the bowl 6. The forward limit switch 57 is connected by wires 59 and 59a, and the rearward limit switch 58 is connected by wires 60 and 60a, to control devices hereinafter to be described.

On the base 1, near the right hand column 4 is the refrigerating compressor 61, having a fly wheel 62; and a belt 63 connects this fly wheel to a motor 64 at the left, by passage around the small pulley 65 thereof. To the rear of the motor 64 is the condenser 66, as here shown, made up of a sinuated system of pipes with one end 66a leading from the cylinder of the compressor 61 and the other end 66b leading into the top of the receiver 67, in which the refrigerating medium is received in highly condensed or liquid form. The outlet of this receiver 67, at its bottom, has an expansion control valve 68, understood to be of any suitable type as well known in the refrigerating art. The refrigerating or cooling coils 39 of the bowl jacket 38 are served by the inlet pipe 69, leading from this expansion control valve 68 to the left and upward; and by the return pipe 70 leading downward at the right of the bowl, to the intake of the compressor 61.

For connection of these pipes 69 and 70 to the tiltable bowl 6, systems of swivel pipe connections are provided, each comprising a swivel joint 71 connecting the pipe 69 or 70 to a pipe section 72, a second swivel joint 73 connecting this section 72 to a second section 74, and a third swivel joint 75 connecting this second section 74 to the inlet end or the outlet end, as the case may be, of the system of refrigerating coils 39 in the jacket 38. The condensed or liquid medium from the receiver 67, expanding in the coils 39, as is well known in the art, absorbs heat from the bowl walls and contents, whether that normal to them under influence of atmospheric temperature, or that generated therein by the friction of the contents, either internally or with the bowl, agitator and brake structures, in the course of mixing. This temperature may be controlled by control of the rate of operation of the compressor 61, or its degree of compression, and by the expansion control valve 68, so that the bowl contents may be maintained at any desired temperature throughout the mixing.

This control, however, would be affected by the temperature of the water introduced into the mixer as an ingredient of the contents, as well, to a less extent, by the temperature of the flour or like ingredient. Also, control of the temperature of the flour or the like is a control of its humidity, and generally affects its consistency as discharged into the bowl.

To control the temperature of the water, the water cooling tank 76 is mounted in the base 1 near the left hand column, with a jacket 76a provided with cooling coils 77 around the tank. A pipe 78 has a T connection with the bowl coil inlet pipe 69 and with the inlet to the cooling tank coils 77, at the bottom thereof, and has a valve 78a interposed in it; and from the outlet of these coils, at the top thereof, a pipe 79 leads to a cross connection 79a in the bowl coil return pipe 70. Expanding cooling medium thus is shunted from the bowl coil system into the tank coils 77, in proportion determined by the opening of the valve 78a. Leading into the top of the cooling tank 76 is the water inlet pipe 80, understood to lead from any suitable source of water supply, preferably a water purifying apparatus, known in the art, and therefore not illustrated. From the bottom of this cooling tank 76 leads the pipe 81 to the right and upward in the right hand column 4 and its hood 5, entering, in the hood 5, the intake side of the water supply pump 82. From the discharge side of this pump a pipe 83 leads upward and to the left into the adjacent end of the distributing pipe or head 33 that discharges the water into the bowl as before described.

A branch pipe 84 leads from a valve 85, interposed in the pipe 83, to the yeast pot 37, which it enters at a tangent to the cylindrical cross section of the pot; so that water, in quantity controlled by the valve 85, thus entering the pot will agitate the yeast or other leavening ingredient with a swirling motion, insuring its thorough dissemination as it is discharged into the bowl 6 through the perforations 37a in the bottom of the yeast pot, as previously described.

The water supply pump 82 is driven by the motor 86; both the pump and motor being understood to be mounted on a wall of the hood 5.

To control the temperature of the flour or the like, an air cooling casing 87 is mounted on the base 1 in the right hand column 4, and contains a system of cooling coils 88. The lower end of these coils 88 is entered by a pipe 89 having a T connection with the bowl coil inlet pipe 69, and having interposed in it a valve 89a; this pipe extending along inside the base 1. The upper end of these coils 88 is connected by a pipe 90 with the T connection 79a, before mentioned, in the bowl coil return pipe 70. Thus, expanding cooling medium is shunted from the bowl coil system into the air cooling coils 88 in proportion determined by the opening of the valve 89a.

The air cooling casing 87 has the outlet 91 into the central intake of the blower 92, mounted on the base 1 at the right of the casing 87. Into the top of this air cooling casing 87 leads the pipe or conduit 93 from the dome 36 of the cyclone separator device on the bowl cover 13. From the peripheral outlet of the blower 92 the pipe or conduit 94 leads to the casing 34 of the cyclone separator device, entering this casing tangentially so that the incoming air takes a swirling or cyclone motion whereby it throws loose the flour or the like which it carries; the flour or like material to drop into the bowl 6, and the air, freed of the material, to escape through the pervious bag 35 into the dome 36, from which it is drawn back through conduit 93 into the air cooling casing 87. The supply conduit 94 leads up along the back of the apparatus; and the return pipe 93 leads down through the right hand column hood 5 near the front of the apparatus, as best seen in Fig. 3.

The flour or like pulverulent material is introduced into the blower discharge pipe 94 by means of a Venturi device 95 operating below a funnel shaped inlet 96 in the top wall of the horizontal part of the pipe 94 where it leads from the blower. The sifter casing 97, of cylindrical shape on a horizontal axis, has in its bottom the sifting outlet comprising a screen 97a, as best seen in Fig. 1. Leading from the left end of this casing 97, next to the screened bottom thereof, is the tailings spout 98, for discharge of coarse particles or tailings which are not passed through the screen 97a; and a removable receptacle or drawer 98a rests on the base 1 under this spout 98, for recovery of the tailings. The sifter casing 97 has, leading from its bottom, under the sifter screen 97a, the funnel shaped discharge spout 99, which enters but does not make contact with the walls of the funnel shaped inlet 96 of the blower discharge conduit 94. This spaced relation of these parts is provided so that the sifter casing is free to move with the weighing supply bin, as will presently be described; and the opening thus left does not interfere with the impelling action of the blower on the pulverulent material, since the action of the venturi 95 is slightly that of drawing air down from the sifter casing and through the space thus left, drawing the material into the conduit 94, where it is carried with the full force of the blast from the blower 92, to the cyclone separator device. This construction and operation are fully set forth and claimed in my Patent No. 2,003,716, issued June 4, 1935. The blower 92 is driven by a motor 100 mounted on the right hand side of the blower casing as seen in Fig. 2; this blower being understood to be any suitable one of well known types of centrifugally acting blowers.

The weighing bin casing 101, at the right of the entire apparatus above described, contains the bin 102 of rectangular box like shape in its top portion, with a bottom narrowing to a substantially semi-cylindrical trough shaped conduit part 103, the left end of which has a connection 104 with the right end of the sifter casing 97, as best seen in Fig. 1. Concentric with the sifter casing and this conduit part, the conveyor shaft 105 has its left end part journaled at 105a in the left end of the sifter casing 97, and its right end part journaled at 105b in the right end wall of the bin 102; thus extending throughout the combined lengths of the sifter casing and the bin conduit part. In the sifter casing this shaft 105 has fixed on it the brush 106 which sweeps the walls of the casing and the sifter screen 97a, to force the pulverulent material down through the screen 97a into the outlet 99 for conveying action as above described.

In the trough shaped conduit part 103 of the bin 102, the helical conveyor screw 107 is fixed on the shaft 105, together with a helical blending screw 108 of much higher pitch than the conveyor screw, so that it acts between the turns of the less highly pitched conveyor screw to thoroughly blend different kinds of pulverulent material, such as different grades or kinds of flour, in the course of travel of the material toward the sifter casing 97 under the forcing action of the conveyor screw 107. The conveyor shaft 105 is rotated by means of a large sprocket wheel 109 fixed thereon where it projects outside its bearing 105b in the bin wall, and a chain 110 connecting this wheel 109 to a small sprocket wheel 111 on the shaft of the motor 112. The motor is mounted inside the casing 101 on a wall thereof with the shaft projecting through the wall, to carry the sprocket wheel 111, which with the chain 110 and sprocket wheel 109, is enclosed in a small casing 109a on the outside of the bin wall.

The casing 101 and the bin 102 are supported on a frame which comprises a back bar 113 and a front bar 113a, and the bin has a back bar 114. Near respective ends, the back bars 113 and 114 have pivot bearings 115 between them whereby the bin is mounted to swing up and down in a front-to-rear plane, on the casing frame. This, as well as the immediately later described construction, is fully disclosed and claimed in my co-pending application, Serial No. 699,206, filed November 22, 1933; so that elaborate disclosure thereof is not necessary; this entire weighing bin apparatus being an element of my present invention only in a broad sense, not concerning its detailed construction. It is sufficient to explain that the bin 102 has a front bracket 116; that a link 117 suspends the left end of a beam 118 from the front frame bar 113a; that the bin is suspended by its front bracket 116 from this beam 118 near the link 117; and that the opposite end of the beam 118 is suspended by a link 119 from the scale beam 120, which is fulcrumed on a post 121 on the front frame bar 113a. The beam 120 has three sections, on which are poises 122, 122a and 122b, respectively, and swings up under the weight of the material placed in the bin 102, and by moving the lower poise 122 to the left until the beam swings down, the weight of the material in the bin is indicated. The upper poises 122a and 122b are moved to the right to indicate the amount desired to be discharged from the bin. A dash pot 123, fixed on the frame of the front bar 113a, has a connection 123a to the beam to the right of its fulcrum 121, making the up swing of the beam 120 gradual.

A cut out switch 124 for the conveyor driving motor 112 is also mounted on the frame and is so actuated by the beam 120, as it swings down upon reduction of the weight of material in the bin 102 by discharge therefrom to the sifter and mixing apparatus, that this switch is opened and the motor 112 and the conveyor are stopped. Thus, by the use of the poises 122a and 122b, in conjunction with this control by the switch 124, the apparatus may be set to discharge any predetermined quantity of material. A two-button switch 124a also is provided for manually starting and stopping the motor 112.

On the front of the hood 3 of the left hand pedestal 2 is mounted a switch with three buttons 125, 125a and 125b for manual control of tilting of the bowl 6; the first two being for return of the bowl from tilted or dumping position and for tilting or dumping the bowl, respectively, and the third being for stopping the tilting or return at any desired stage. Just below this switch is a switch with three buttons 126, 126a and 125b, for causing high speed, low speed and stoppage, respectively, of the agitator 7. Below these switches are control clocks 127 and 127a. Clock 127 keeps the motors 12 running at low speed for duration of time set, and then shifts them to high speed. Clock 127a keeps motors at high speed for its set duration and then stops motors 12. Above these clocks is an inching switch 128 with two buttons, for starting and stopping the agitator 7; being a manual control for moving the agitator independently of the clock control. Up to the right of these devices is a rheostat 129 for control of current to the lamps 32, to vary their intensity.

On the front of the upper part of the right hand column hood 5 is a revolution counter 130, by which may be observed the number of revolutions made by the water supply pump 82, which, the pump having a known capacity per revolution, enables the operator to note the completion of supply of any desired quantity of water to the bowl 6. Just below this counter 130 is a two button switch 131 for starting and stopping the motor 86 of this pump 82, under the guidance of the counter 130 as just described. On the front of the left hand column hood 3, down to the left of the devices previously described as being thereon, are the two-button switch for starting and stopping the motor 100 of the blower 92, and the two-button switch 133 for starting and stopping the motor 64 of the compressor 61; the latter switch 133 thus affording manual control of the refrigeration of the bowl 6, of the water supply and of the air-actuated supply of flour or the like.

Figure 5:
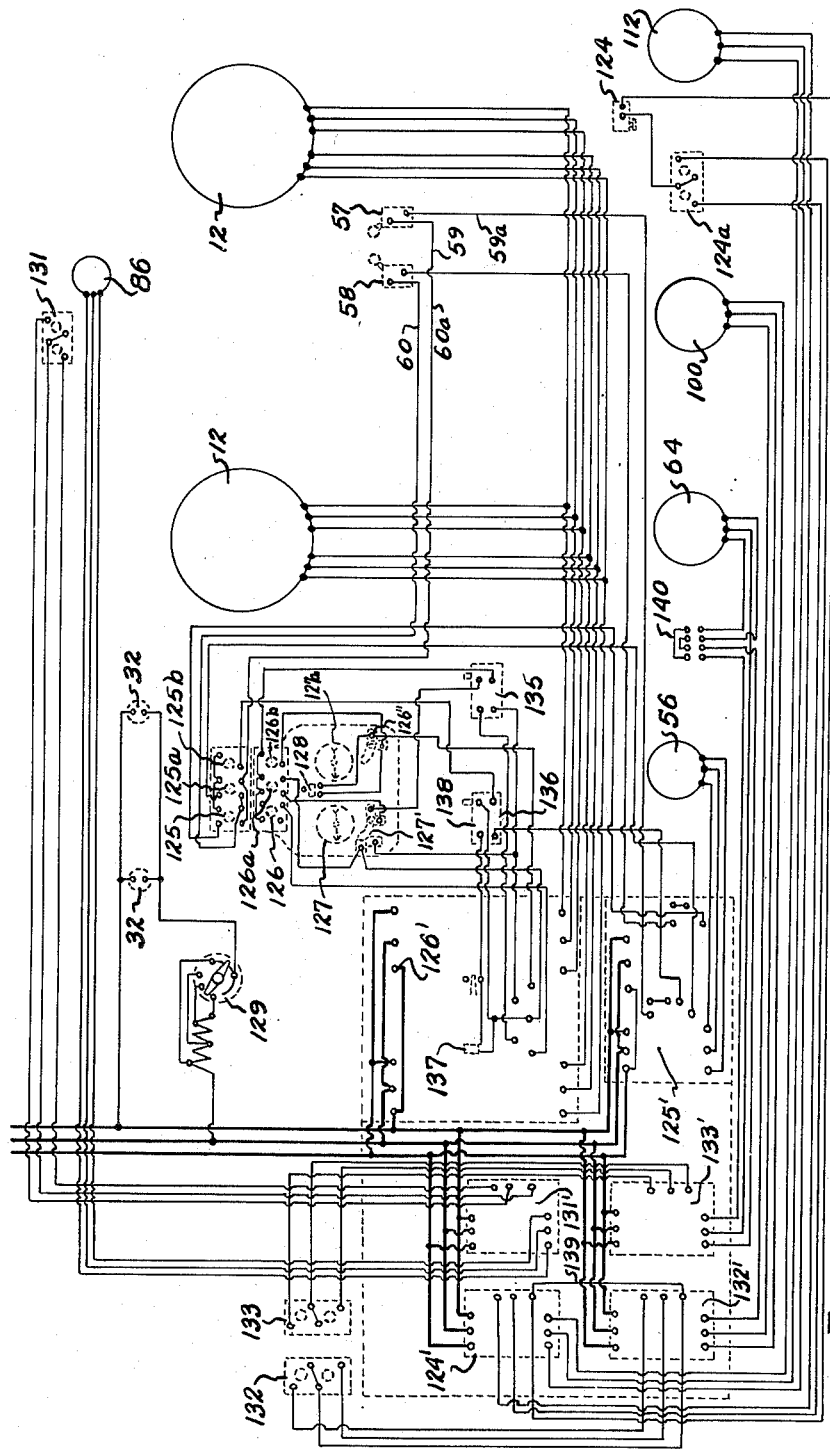
Figure 5 is a diagram of the electrical controlling devices and their connections.

In the front of the lower part of the left hand column 2, is the panel 134 which carries the electrical control devices associated with the various outside devices just above described; and which when swung open, affords access to them for adjustment or repairs. The devices on this panel 134 are not illustrated except in the diagram, Fig. 5, wherein all of them are shown, with their connections to the various outside devices and the apparatus they control, as well as the source of current supply. This is shown as a three-wire system; but it will be understood that it may be adapted to a two-wire system.

In this diagram, at 124' are shown the controller for the sifter and conveyor motor 112, and its relation to the cut out switch 124 and starting switch 124a and motor 112; at 125' are shown the reversible bowl-tilt control, its relation to the switch buttons 125, 125a and 125b and the cam actuated switches 57 and 58 and the motor 56; at 126' are shown the two-speed agitator control and its relation to the switch buttons 126, 126a and 126b and the motors 12; at 126'' are shown the stop switch in its relation to the switch button 126b and the motors 12; at 127' are shown the pole-changing switch for changing from low speed clock 127 to high speed clock speed 127a, accordingly as the agitator is to be operated at one or the other speed, and its relation to the clocks; and at 131', 132' and 133' are shown the controls for the water pump motor 86, the flour-conveying blower motor 100 and the refrigerating compressor motor 64, and their relation to the two-button switches 131, 132 and 133, respectively.

Provision also is made for preventing operation of the agitator 7 when the bowl 6 is tilted for dumping; and also for preventing dumping while the agitator is running. The agitator cut out is shown at 135 in the diagram; the dump cut out at 136. These are interlocked at 137, and 138 is the interlock cut out, which is closed with the bowl tilted and open with the bowl in operating position; acting as a jumper around the electric interlock 137 to permit inching in both high and low speed. Contacting the inching switch 128 permits the operator to hold in the low or high speed push button, and then both the motors 12 will run as long as the button is held in. The device permits discharging of the dough by action of the agitator 7 with the bowl 6 in tilted position.

The clocks 127 and 127a are graduated in minutes, permitting observance for setting them for any desired duration of agitator operation. The low speed clock 127 will run its duration and automatically change from low to high speed of the agitator motors. Then the high speed clock, after keeping the agitator motors 12 running at high speed for its set duration, automatically stops the motors.

The control 124' for the conveyor and sifter motor 112 and the control 132' for the blower motor 100 are fitted with a jumper line 139 to start these two motors simultaneously from either switch 124a or 132; but the blower motor 100 continues to operate, after the conveyor and sifter motor 112 has been stopped by the scale-controlled switch 124, until the stop button of the blower motor control switch 132 has been pressed.

In addition to the start and stop switch 133 for the compressor motor 64, a pressure switch 140 is provided, with its pressure device interposed in the compressor discharge pipe and the switch in circuit with the start and stop buttons of the switch 133, for automatic starting at minimum pressure and automatic stopping at maximum pressure, respectively. It will be understood that this automatic pressure switch, as is well known in the art, may be adjusted to maintain a refrigeration effect within close limits, for the bowl 6, for the water supply and for the air supply that carries the flour or the like to the bowl.

It will be seen that I have provided, in a compact unit, a complete plant for combining dough ingredients and mixing and treating the dough, with complete control of all factors entering into the operation, automatically in those instances where automatic control is most necessary, and manually in place of the automatic controls if desired, and manually only, in those instances where manual control is adequate. This compact and relatively simple assemblage, arranged for convenient observation and control by the operator, permits of exact results in the preparation of dough. The ease of change in adjustments of automatic devices, and ready manual control, affords every modification of action of the apparatus to conform with different requirements, in working different materials for different products, with a minimum of thought and care. Chance of mistakes is reduced, and uniformity and excellence of product are better insured, by the effective arrangement and correlation of devices.

It will be understood that not all of the devices are necessarily provided as herein set forth. For instance, the return of air through conduit 93 may be dispensed with, continually refrigerating a fresh supply of air from the atmosphere. One or more of the accessories, such as the light apparatus or the automatic yeast supply, may be omitted. The inspection lid 17 may be replaced by a continuation of the cover 13, stationary, with the bowl shaped accordingly. The automatic control of bowl tilting and the safety provision as to agitator operation and bowl tilting may be dispensed with. Any one or several of these changes may occur; and any of the devices may be modified, of themselves or in certain relations to each other. These or other modifications may occur in practice without departing from the spirit of my invention, and although I have rather specifically illustrated and described a certain preferred embodiment of my invention, it will be understood that I am not limited to such precise disclosure, but what I claim as new and desire to secure by Letters Patent is:

1. In mixing apparatus, a bowl mounted for tilting, mixing means in the bowl, a stationed cover for the bowl, closing the bowl when the bowl is tilted into position for mixing operation, water distributing means mounted on the stationed cover for discharge into the bowl, means stationed aside from the bowl and cover, for supply of water to said distributing means, a device mounted on the stationed cover for supplying a leavening ingredient to the contents of the bowl, and means for diverting a part of the water from said supply means to said device, introducing the water to said device with a disseminating action on the leavening ingredient therein.

2. In mixing apparatus, a tiltable bowl, mixing means in the bowl, a reversible motor operatively connected to said bowl for tilting it in one direction or another, means for reversing the operation of the motor, and means actuated by the tilting of the bowl to operate the reversing means in respective final stages of bowl tilting, whereby the extent of tilting of the bowl is automatically controlled.

3. In mixing apparatus, a tiltable bowl, operatable mixing means in the bowl, power means for tilting the bowl, power means for operating the mixing means, and control devices for energizing the respective power means, and having a mutually inhibitive relation to each other whereby operation of the mixing means is prevented while the bowl is tilted from position for operation of the mixing means, and tilting of the bowl from said position is prevented while the mixing means is being operated, and means for manually eliminating the mutually inhibiting relation of said control devices, whereby the mixing means may be operated by its power operating means while the bowl is tilted away from said position.

4. In mixing apparatus, a tiltable bowl, operatable mixing means in the bowl, power means operatively connected to said bowl for tilting it, reversible for tilting the bowl in one direction or another, means for reversing the operation of the power means, means actuated incident to tilting of the bowl, operating the reversing means in respective final stages of bowl tilting, whereby the extent of tilting of the bowl is automatically controlled, power means for operating the mixing means, control devices, respectively for the bowl tilting power means and the power means that operates the mixing means, having a mutually inhibitive relation whereby opertion of the mixing means is prevented while the bowl is tilted from position for operation of the mixing means, and tilting of the bowl is prevented while the mixing means is being operated, means operatable manually for starting and stopping tilting of the bowl independently of the automatic control of said tilting, and means for manually eliminating the mutually inhibiting relation of said control devices, whereby the mixing means may be operated by its power means while the bowl is tilted away from said position for operation of the mixing means.

5. In mixing apparatus, a bowl, an agitator in said bowl, power means for driving said agitator, operatable at a plurality of different speeds, time controlled devices for determining the duration of operation of the agitator-driving power means at the respective speeds, and means whereby a change from one speed to the other is automatically effected by the operation of one time controlled device at the end of a stage of operation determined by it, and the control of duration of operation at the newly established speed is transferred to another one of the time controlled devices.

EDWARD J. LAUTERBUR.